(12) United States Patent
Brown et al.

(10) Patent No.: US 10,599,488 B2
(45) Date of Patent: Mar. 24, 2020

(54) MULTI-PURPOSE EVENTS FOR NOTIFICATION AND SEQUENCE CONTROL IN MULTI-CORE PROCESSOR SYSTEMS

(71) Applicant: Oracle International Corporation, Redwood Shores, CA (US)

(72) Inventors: David A. Brown, Austin, TX (US); Rishabh Jain, Austin, CA (US); Michael Duller, San Francisco, CA (US); Erik Schlanger, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/197,436

(22) Filed: Jun. 29, 2016

(65) Prior Publication Data
US 2018/0004581 A1    Jan. 4, 2018

(51) Int. Cl.
*G06F 3/00*   (2006.01)
*G06F 9/54*   (2006.01)
*G06F 13/28*  (2006.01)

(52) U.S. Cl.
CPC .............. *G06F 9/542* (2013.01); *G06F 13/28* (2013.01)

(58) Field of Classification Search
CPC ....................................................... G06F 9/542
USPC ......................................................... 719/318
See application file for complete search history.

(56) References Cited

U.S. PATENT DOCUMENTS

| | | |
|---|---|---|
| 4,626,829 A | 12/1986 | Hauck |
| 5,109,226 A | 4/1992 | MacLean |
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |
| 5,581,705 A | 12/1996 | Passint et al. |
| 5,592,622 A * | 1/1997 | Isfeld .................... G06F 13/387 709/207 |
| 5,617,567 A | 4/1997 | Doktor |
| 5,655,080 A | 8/1997 | Dias et al. |

(Continued)

FOREIGN PATENT DOCUMENTS

| | | |
|---|---|---|
| EP | 1 111 500 A1 | 3/1996 |
| EP | 2040180 A1 | 3/2009 |

(Continued)

OTHER PUBLICATIONS

S. W. Smith D. Safford, Practical server privacy with secure coprocessors (Year: 2001).*

(Continued)

*Primary Examiner* — Lechi Truong
(74) *Attorney, Agent, or Firm* — Hickman Palermo Becker Bingham LLP (57) ABSTRACT

Techniques are provided for improving the performance of a constellation of coprocessors by hardware support for asynchronous events. In an embodiment, a coprocessor receives an event descriptor that identifies an event and a logic. The coprocessor processes the event descriptor to configure the coprocessor to detect whether the event has been received. Eventually a device, such as a CPU or another coprocessor, sends the event. The coprocessor detects that it has received the event. In response to detecting the event, the coprocessor performs the logic.

17 Claims, 7 Drawing Sheets

(56) References Cited

U.S. PATENT DOCUMENTS

| | | | |
|---|---|---|---|
| 5,675,382 A | 10/1997 | Bauchspies | |
| 5,696,956 A | 12/1997 | Razdan et al. | |
| 5,696,959 A | 12/1997 | Guttag | |
| 5,706,495 A | 1/1998 | Chadha et al. | |
| 5,826,529 A | 10/1998 | Doktor | |
| 5,884,299 A | 3/1999 | Ramesh | |
| 5,887,183 A | 3/1999 | Agarwal | |
| 5,933,650 A | 8/1999 | Van Hook | |
| 5,987,407 A | 11/1999 | Wu | |
| 5,996,708 A | 12/1999 | Gerold | |
| 6,006,179 A | 12/1999 | Wu | |
| 6,047,081 A | 4/2000 | Groezinger et al. | |
| 6,065,070 A | 5/2000 | Johnson | |
| 6,118,724 A | 9/2000 | Higginbottom | |
| 6,161,173 A | 12/2000 | Krishna | |
| 6,178,405 B1 | 1/2001 | Ouyang | |
| 6,219,457 B1 | 4/2001 | Potu | |
| 6,317,824 B1 | 11/2001 | Thakkar et al. | |
| 6,331,826 B1 | 12/2001 | Wagner | |
| 6,336,180 B1 | 1/2002 | Long | |
| 6,381,601 B1 | 4/2002 | Fujiwara et al. | |
| 6,416,410 B1 | 7/2002 | Abou-Samra | |
| 6,496,915 B1 | 12/2002 | Halleck | |
| 6,604,155 B1 | 8/2003 | Chong et al. | |
| 6,671,797 B1 | 12/2003 | Golston | |
| 6,745,174 B2 | 6/2004 | Levy et al. | |
| 6,779,105 B1 | 8/2004 | Bouyoux | |
| 6,829,697 B1 | 12/2004 | Davis et al. | |
| 6,842,848 B2 | 1/2005 | Hokenek et al. | |
| 6,996,569 B1 | 2/2006 | Bedell et al. | |
| 7,047,252 B2 | 5/2006 | Buch et al. | |
| 7,490,221 B2 | 2/2009 | Evans | |
| 7,617,346 B2 | 11/2009 | Wang et al. | |
| 7,725,595 B1 | 5/2010 | Geissler et al. | |
| 7,769,726 B2 | 8/2010 | Faerber et al. | |
| 7,861,060 B1 | 12/2010 | Nickolls et al. | |
| 7,991,794 B2 | 8/2011 | Bedi et al. | |
| 8,049,760 B2 | 11/2011 | Jiao et al. | |
| 8,126,855 B2 | 2/2012 | Faerber et al. | |
| 8,260,803 B2 | 9/2012 | Hsu et al. | |
| 8,285,709 B2 | 10/2012 | Candea et al. | |
| 8,326,810 B2 | 12/2012 | Faerber et al. | |
| 8,375,145 B2 | 2/2013 | Kagan et al. | |
| 8,521,788 B2 | 8/2013 | Ellison et al. | |
| 8,533,216 B2 | 9/2013 | Buger et al. | |
| 8,543,534 B2 | 9/2013 | Alves et al. | |
| 8,572,131 B2 | 10/2013 | Ellison et al. | |
| 8,589,613 B2 | 11/2013 | Griggs | |
| 8,667,252 B2 | 3/2014 | Colavin et al. | |
| 8,725,707 B2 | 5/2014 | Chen et al. | |
| 8,826,522 B2 | 9/2014 | Roblot | |
| 8,938,644 B2 | 1/2015 | Clark et al. | |
| 8,996,463 B2 | 3/2015 | Merriman et al. | |
| 9,432,298 B1 | 8/2016 | Smith | |
| 9,658,675 B1* | 5/2017 | Witek | G06F 1/3237 |
| 9,658,676 B1* | 5/2017 | Witek | G06F 1/3237 |
| 9,977,664 B2 | 5/2018 | Toyama | |
| 2001/0037345 A1 | 11/2001 | Kiernan et al. | |
| 2002/0032678 A1 | 3/2002 | Cornwell et al. | |
| 2002/0033762 A1 | 3/2002 | Belu | |
| 2002/0091826 A1 | 7/2002 | Comeau | |
| 2002/0091905 A1 | 7/2002 | Krishna | |
| 2002/0095562 A1 | 7/2002 | Nakanishi | |
| 2002/0154154 A1* | 10/2002 | Cornelius | G06F 3/0481 715/705 |
| 2002/0165896 A1 | 11/2002 | Kim | |
| 2002/0184392 A1 | 12/2002 | Parthasarathy et al. | |
| 2002/0188830 A1 | 12/2002 | Boles et al. | |
| 2003/0135495 A1 | 7/2003 | Vagnozzi | |
| 2003/0167460 A1 | 9/2003 | Desai | |
| 2003/0182464 A1* | 9/2003 | Hamilton | G06F 9/546 719/314 |
| 2003/0187858 A1 | 10/2003 | Kirk et al. | |
| 2004/0030863 A1 | 2/2004 | Paver | |
| 2004/0068642 A1 | 4/2004 | Tanaka | |
| 2004/0160446 A1* | 8/2004 | Gosalia | G06F 9/4843 345/503 |
| 2004/0221192 A1 | 11/2004 | Motta | |
| 2005/0091256 A1 | 4/2005 | Rathakrishnan et al. | |
| 2005/0177706 A1 | 8/2005 | Lee | |
| 2006/0116989 A1 | 6/2006 | Bellamkonda et al. | |
| 2006/0179255 A1 | 8/2006 | Yamazaki | |
| 2007/0061600 A1 | 3/2007 | Kuroda | |
| 2007/0074214 A1* | 3/2007 | Ueno | G06F 9/542 718/100 |
| 2007/0203925 A1 | 8/2007 | Sandler et al. | |
| 2008/0046686 A1 | 2/2008 | Cameron | |
| 2008/0134213 A1* | 6/2008 | Alverson | G06F 11/0709 719/318 |
| 2008/0294863 A1 | 11/2008 | Faerber et al. | |
| 2009/0028192 A1 | 1/2009 | Rieger | |
| 2009/0037700 A1 | 2/2009 | Graham | |
| 2009/0055350 A1 | 2/2009 | Branish et al. | |
| 2009/0094193 A1 | 4/2009 | King et al. | |
| 2009/0235047 A1 | 9/2009 | Hachmann | |
| 2009/0287628 A1 | 11/2009 | Indeck | |
| 2009/0287637 A1 | 11/2009 | Day et al. | |
| 2009/0313210 A1 | 12/2009 | Bestgen et al. | |
| 2010/0020880 A1 | 1/2010 | Susnow | |
| 2010/0030728 A1 | 2/2010 | Chakkappen et al. | |
| 2010/0030796 A1 | 2/2010 | Netz et al. | |
| 2010/0082705 A1 | 4/2010 | Bhashyam et al. | |
| 2010/0088309 A1 | 4/2010 | Petcelescu et al. | |
| 2010/0106944 A1 | 4/2010 | Symes | |
| 2010/0115295 A1 | 5/2010 | Diab | |
| 2010/0115347 A1 | 5/2010 | Noyes | |
| 2010/0161646 A1 | 6/2010 | Ceballos et al. | |
| 2010/0191918 A1 | 7/2010 | Lee et al. | |
| 2010/0257391 A1 | 10/2010 | Dring | |
| 2010/0278446 A1 | 11/2010 | Ganesh et al. | |
| 2010/0299316 A1 | 11/2010 | Faerber et al. | |
| 2011/0029557 A1 | 2/2011 | Raghavan et al. | |
| 2011/0106804 A1 | 5/2011 | Keeler et al. | |
| 2011/0228325 A1 | 9/2011 | Shiraishi | |
| 2012/0005509 A1 | 1/2012 | Araki | |
| 2012/0014265 A1 | 1/2012 | Schlansker | |
| 2012/0054225 A1 | 3/2012 | Marwah et al. | |
| 2012/0071152 A1* | 3/2012 | Roundtree | H04W 4/001 455/419 |
| 2012/0159448 A1* | 6/2012 | Arcese | G06F 11/28 717/124 |
| 2012/0166447 A1 | 6/2012 | Nice | |
| 2012/0197868 A1 | 8/2012 | Fauser | |
| 2012/0209873 A1 | 8/2012 | He | |
| 2012/0234908 A1 | 9/2012 | Wang | |
| 2013/0151458 A1* | 6/2013 | Indeck | G06N 5/025 706/47 |
| 2013/0151567 A1 | 6/2013 | Ellison et al. | |
| 2013/0151568 A1 | 6/2013 | Ellison et al. | |
| 2013/0275473 A1 | 10/2013 | Ellison et al. | |
| 2013/0303663 A1 | 11/2013 | Agnely et al. | |
| 2014/0013076 A1 | 1/2014 | Ganesh et al. | |
| 2014/0013077 A1 | 1/2014 | Ganesh et al. | |
| 2014/0013078 A1 | 1/2014 | Ganesh et al. | |
| 2014/0052713 A1 | 2/2014 | Schauer et al. | |
| 2014/0052726 A1 | 2/2014 | Amberg et al. | |
| 2014/0074818 A1 | 3/2014 | Barber | |
| 2014/0095748 A1 | 4/2014 | Aingaran et al. | |
| 2014/0096145 A1 | 4/2014 | Aingaran et al. | |
| 2014/0208138 A1 | 7/2014 | Homchaudhuri | |
| 2014/0208331 A1* | 7/2014 | Li | G06F 9/5044 718/105 |
| 2014/0281354 A1 | 9/2014 | Tkacik | |
| 2014/0304490 A1 | 10/2014 | Toyama | |
| 2015/0046411 A1 | 2/2015 | Kazmaier | |
| 2015/0074384 A1 | 3/2015 | Yajima | |
| 2015/0088926 A1 | 3/2015 | Chavan et al. | |
| 2015/0181273 A1 | 6/2015 | Shaool | |
| 2015/0261535 A1* | 9/2015 | Snyder, II | G06F 9/3881 712/34 |
| 2016/0007037 A1 | 1/2016 | Zhao et al. | |
| 2016/0019064 A1 | 1/2016 | Brooks et al. | |
| 2016/0285623 A1 | 9/2016 | Yoon | |

(56) References Cited

U.S. PATENT DOCUMENTS

| | | | |
|---|---|---|---|
| 2016/0350347 | A1 | 12/2016 | Das et al. |
| 2017/0024435 | A1 | 1/2017 | Kociubes et al. |
| 2017/0039238 | A1 | 2/2017 | Elias |
| 2017/0060587 | A1 | 3/2017 | Chavan |
| 2017/0085378 | A1 | 3/2017 | Shields |
| 2017/0185527 | A1 | 6/2017 | Ueda |
| 2017/0270052 | A1 | 9/2017 | Brown et al. |
| 2017/0270053 | A1 | 9/2017 | Brown |
| 2017/0322725 | A1 | 11/2017 | Klingenberg |
| 2018/0067889 | A1 | 3/2018 | Brown |
| 2018/0101530 | A1 | 4/2018 | Brown |
| 2018/0107627 | A1 | 4/2018 | LeBeane et al. |

FOREIGN PATENT DOCUMENTS

| | | | | |
|---|---|---|---|---|
| EP | 2423843 | A1 | 2/2012 | |
| GB | 2 306 868 | A | 5/1997 | |
| GB | 2338095 | A * | 12/1999 | ......... G06F 9/30098 |
| JP | 2000261674 | A | 9/2000 | |
| WO | WO2010/039895 | | 4/2010 | |
| WO | WO 2013/095653 | A1 | 6/2013 | |
| WO | WO 2013/095662 | A1 | 6/2013 | |

OTHER PUBLICATIONS

Coprocessor Wizard, Platform Studio, .xilinx.com/itp/xilinx10/help/platform_studio/ps_c_cpw_coprocessor_wizard.htm, 2008, 2 pages.
Binkert et al., "A Simple Integrated Network Interface for High-Bandwidth Servers", dated Jan. 2006, 22 pages.
Schmit et al., "PipeRench: A Virtualized Programmable Datapath in 0.18 Micron Technology", dated 2002, 4 pages.
"MonetDB", Wikipedia, available: http://en.wikipedia.org/wiki/MonetDB, dated May 16, 2012, 3 pages.
Anonymous:, "Hash Table—Wikipedia, the free encyclopedia", dated Jun. 20, 2012, retrieved from the internet: http://wayback.archive.org/wiki/harshtable, 18 pages.
Brewer et al., "Remote Queues: Exposing Message Queues for Optimization and Atomicity", dated Jul. 17, 1995, ACM, 12 pages.
CCCP: Accelerator Virtualization, http://cccp.eecs.umich.edu/research/virtual.php, printed on Jul. 4, 2012, 3 pages.
Dynamic Scheduling Techniques, http://www.cs.iastate.edu/~prabhu/Tutorial/PIPELINE/dynamSchedTech.html, printed on Jul. 4, 2012, 2 pages.
IBM Technical Disclosure Bulletin, "Data Packing and Upacking Scheme for High Performance Image Processing", vol. No. 7, dated Jul. 1993, 6 pages.
"Column Store Features" monedb, available: http://moneybd.org/Home/Features, dated 2008-2013, 3 pages.
Park et al., "Polymorphic Pipeline Array: A Flexible Multicore Accelerator with Virtualized Execution for Mobile Multimedia Applications", Dated Dec. 12, 2009 11 pages.
Zukowski, M. "Vectorwise: Beyond Column Stores" ACTIAN 2012, 17 pages.
Silva et al., "Using a Tighly-Coupled Pipeline in Dynamically Reconfigureable Platform FPGAs", dated May 2003, 4 pages.
W. Cockshott et al., "High-Performance Operations Using a Compressed Database Architecture" The Computer Journal, vol. 41, 1998, 14 pages.
Weinhardt, Markus, "Compilation and Pipeline Synthesis for Reconfigurable Architectures", 1997, 8 pages.
Wikipedia, "In Memory Database", Dated Jan. 30, 2013, 4 pages.
Wikipedia, "SIMD", Single Instruction Multiple Instruction, dated Jan. 1, 2013, 7 pages.
Zhou et al., "Efficient SIMD Optimization for Media Processors", Journal of Zhejiang University Science A, dated Apr. 2008, 7 pages.
IBM, "Data Packing and Unpacking Scheme for High Performance Image Processing", vol. 36, No. 7, dated Jul. 1993, 6 pages.
Kociubes U.S. Appl. No. 14/806,576, filed Jul. 22, 2015, Interview Summary, dated Feb. 14, 2018.
Brown, U.S. Appl. No. 15/362,688, filed Nov. 28, 2016, Notice of Allowance, dated Apr. 25, 2018.
Brown, U.S. Appl. No. 15/073,905, filed Mar. 18, 2016, Notice of Allowance, dated Apr. 24, 2018.
Brooks, U.S. Appl. No. 14/867,929, filed Sep. 28, 2015, Final Office Action, dated May 31, 2018.
Kociubes, U.S. Appl. No. 14/806,576, filed Jul. 22, 2015, Notice of Allowance, dated Apr. 11, 2018.
Chavan, U.S. Appl. No. 15/211,418, filed Jul. 15, 2016, Office Action, dated May 4, 2018.
Brooks, U.S. Appl. No. 14/867,929, filed Sep. 28, 2015, Interview Summary, dated Apr. 25, 2018.
Schlegel et al., "Fast Integer Compression Using SIMD Instructions", dated 2010, ACM, 7 pages.
U.S. Appl. No. 15/362,693, filed Nov. 28, 2016, Notice of Allowance, dated Aug. 7, 2018.
Brown, U.S. Appl. No. 15/290,357, filed Oct. 11, 2016, Office Action, dated Aug. 27, 2018.
Brown, U.S. Appl. No. 15/256,936, filed Sep. 6, 2016, Office Action, dated Sep. 20, 2018.
Brooks, U.S. Appl. No. 14/867,929, filed Sep. 28, 2015, Advisory Action, dated Aug. 28, 2018.
Chavan, U.S. Appl. No. 15/211,418, filed Jul. 15, 2016, Notice of Allowance, dated Oct. 31, 2018.
Brown, U.S. Appl. No. 15/290,357, filed Oct. 11, 2016, Interview Summary, dated Dec. 4, 2018.
Brown, U.S. Appl. No. 15/256,936, filed Sep. 6, 2016, Interview Summary, dated Dec. 19, 2018.
Jain, U.S. Appl. No. 15/362,673, filed Nov. 28, 2016, Notice of Allowance, dated Jun. 14, 2019.
Brown, U.S. Appl. No. 15/256,936, filed Sep. 6, 2016, Suplemental Notice of Allowability, dated May 24, 2019.
Brown, U.S. Appl. No. 15/290,357, filed Oct. 11, 2016, Final Office Action, dated Feb. 15, 2019.
Brown, U.S. Appl. No. 15/290,357, filed Oct. 11, 2016, Advisory Action, dated Mar. 15, 2019.
Brooks, U.S. Appl. No. 14/867,929, filed Sep. 28, 2015, Office Action, dated Mar. 18, 2019.
Thekkath et al., "Separating Data and Control Transfer in Distributed Operating Systems", ASPLOS, San Jose, ACM, dated 1994, 10 pages.
Brown, U.S. Appl. No. 15/256,936, filed Sep. 6, 2016, Notice of Allowance, dated Mar. 29, 2019.
Jain, U.S. Appl. No. 15/362,673, filed Nov. 28, 2016, Office Action, dated Mar. 28, 2019.
Ganesh, U.S. Appl. No. 14/023,064, filed Sep. 10, 2013, Notice of Allowance dated Jun. 16, 2017.
Chavan, U.S. Appl. No. 14/3385,219, filed Jul. 22, 2014, Office Action dated Jun. 2, 2017.
Brooks, U.S. Appl. No. 14/867,929, filed Sep. 28, 2015, Office Action dated Jul. 13, 2017.

* cited by examiner

COPROCESSOR 340

| DESCRIPTOR QUEUE 301 | | |
|---|---|---|
| DESCRIPTOR | EVENT | LOGIC |
| 351 | 1 | HANDLER A |
| 352 | 2 | HANDLER A |
| 353 | 1 | HANDLER B |

MULTI-PURPOSE EVENTS FOR NOTIFICATION AND SEQUENCE CONTROL IN MULTI-CORE PROCESSOR SYSTEMS

FIELD OF THE DISCLOSURE

This disclosure relates to coprocessor coordination. Techniques are presented for flow control based on hardware-supported asynchronous events.

BACKGROUND

The capacity and utility of coprocessors, such as hardware accelerators, are increasing. Graphics, cryptography, mathematics, and streaming are important applications of coprocessors. Fabrication innovations such as a system on a chip (SoC) and a three-dimensional integrated circuit (3D IC) make coprocessors even more attractive, because coprocessors can be bundled with a central processing unit (CPU).

However, coprocessors may introduce coordination problems. Traditional ways of orchestrating coprocessors include interrupts, polling, and centralized control. For example in the case of multicore symmetric multiprocessing (SMP), coordination mechanisms may include a core-to-core mailbox, a semaphore that is implemented in memory or a register, or by using an interrupt that is initiated by one core and directed to another core.

Centralized control of coprocessors by a CPU may impact system throughput by sub-optimally idling either the CPU or the coprocessor. An interrupt may complicate the enforcement of a critical section of an application, may compromise the atomicity of a unit of work, and may cause priority inversion. Polling is notoriously inefficient in some scenarios.

Centralized control also prevents multiple coprocessors from coordinating directly with each other as peers. As such, the interaction patterns that are supported by traditional co-processing models do not offer the flexibility that is available to general purpose software.

Suboptimal coordination of coprocessors can cause idling (dark silicon). Dark silicon may increase the unit cost of fabrication as amortized over a given amount of computation. For example, a computation that uses only half of the available coprocessors at a given moment might still need to budget for the cost of fabricating all of the available coprocessors. Underutilization may also increase latency and decrease system throughput.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Example Computer
      2.1 Example Coordination
      2.2 Cascaded Operation
   3.0 Example Flow Control Process
   4.0 Descriptor Queue
      4.1 Fire And Forget
   5.0 Preregistration
   6.0 Global Event Distributor
   7.0 Event Bitmap
      7.1 Event Multiplexing
   8.0 Hardware Overview

1.0 General Overview

Techniques are provided for improving the performance of a constellation of coprocessors by hardware support for asynchronous events. In an embodiment, a coprocessor receives an event descriptor that identifies an event and a logic. The coprocessor processes the event descriptor to configure the coprocessor to detect whether the event has been received. Eventually a device, such as a CPU or another coprocessor, sends the event. The coprocessor detects that it has received the event. In response to detecting the event, the coprocessor performs the logic.

In an embodiment, a coprocessor may execute an instruction that waits for one or more given asynchronous events to arrive.

In an embodiment, a global event distributor enables publish/subscribe integration of coprocessors.

In an embodiment, each coprocessor has an event bitmap that latches received events.

In an embodiment, a software-configurable event descriptor specifies an event to wait for and a logic to subsequently execute. In an embodiment, a coprocessor maintains a queue of event descriptors that await processing.

2.0 Example Computer

Figure 1:
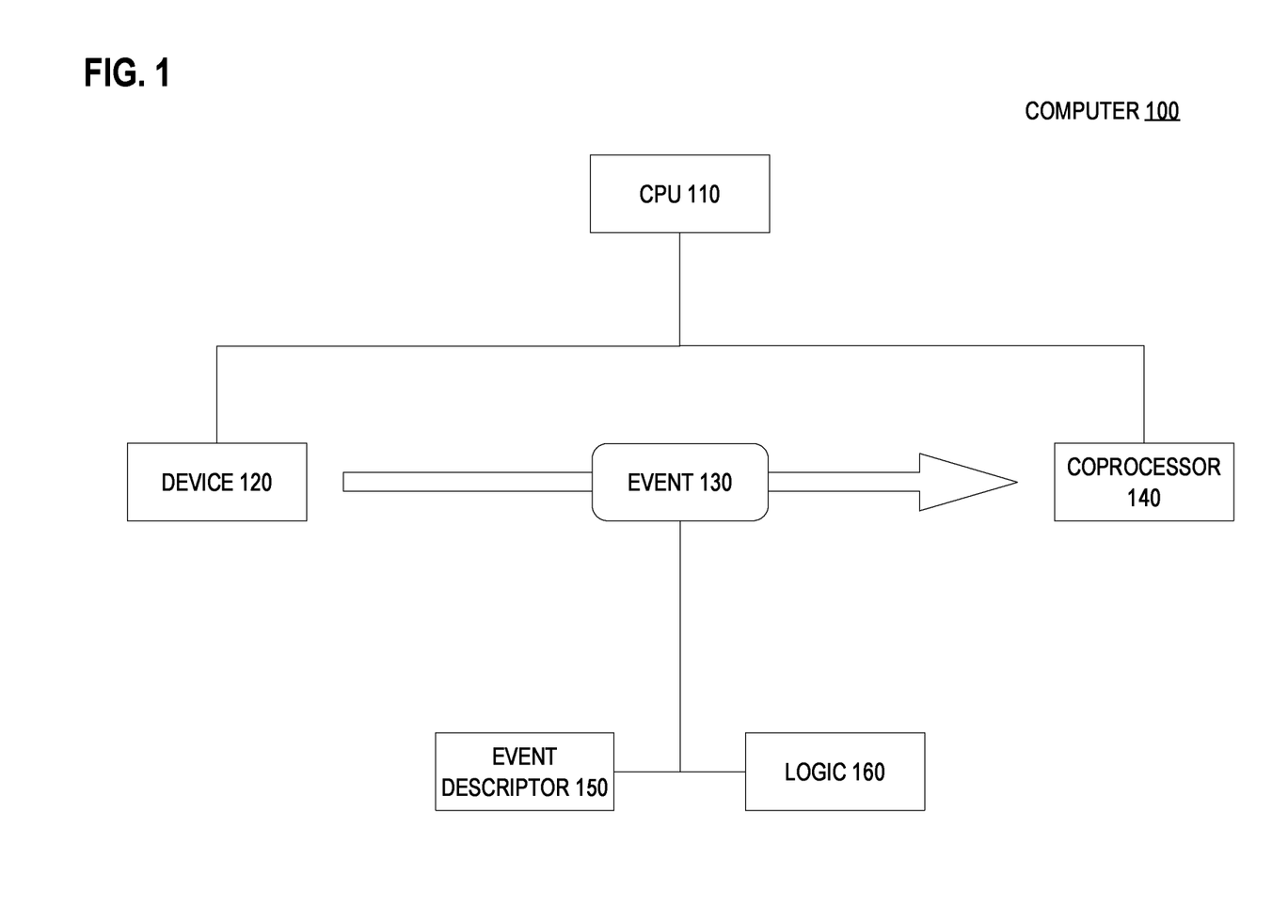
FIG. 1 is a block diagram that depicts an example computer that enforces flow control, in an embodiment.

FIG. 1 is a block diagram that depicts an example computer 100, in an embodiment. Computer 100 uses an asynchronous event to perform flow control for a coprocessor.

Computer 100 may be any computer having a central processing unit (CPU), such as 110, and at least one coprocessor, such as 140. Computer 100 may have a form factor such as a blade or other rack server, a personal computer, a mainframe, smartphone, or other computer enclosure.

Coprocessor 140 may be an arithmetic coprocessor, a graphics coprocessor, a signal coprocessor, an encryption coprocessor, a direct memory access (DMA) controller, an input/output (IO) coprocessor, a computational core, or other coprocessor that offloads work from CPU 110.

Coprocessor 140 may or may not have its own instruction stream. For example, coprocessor 140 may be one of several symmetric or heterogeneous cores inside or directly connected to CPU 110.

Computer 100 also contains device 120, which may be another coprocessor and perhaps similar to coprocessor 140. Although device 120 is shown as an element that is distinct from CPU 110, CPU 110 may be device 120.

In operation, coprocessor 140 may receive asynchronous events, such as 130, from other devices within computer 100, such as device 120. Although device 120 is shown as an element that is distinct from coprocessor 140, coprocessor may be device 120 that sends itself event 130.

Event 130 may or may not bear data values and may instead be a signal by itself, such as a signal generated by software. Events such as 130 are asynchronous such that multiple events may be sent to coprocessor 140 and retained for later processing, although not necessarily in the order received.

Before receiving event 130, coprocessor 140 may receive and at least partially process event descriptor 150. Event descriptor 150 identifies event 130 and logic 160. For example, event 130 may be assigned a unique event value (e.g. an integer) that event descriptor 150 may bear.

Logic 160 may be custom circuitry, an instruction sequence, such as a subroutine, or other configured process. In a preferred embodiment, logic 160 is behavior that is hardwired into dedicated circuitry. In an embodiment, descriptor 150 contains executable instructions that implement logic 160

In an embodiment, logic 160 resides in a memory, and event descriptor 150 may identify logic 160 by a function pointer or method handle. In an embodiment, logic 160 is identified by a token that coprocessor 140 may use as a lookup key for selecting logic 160 from amongst several logics.

In an embodiment, coprocessor 140 may determine which of several logics is logic 160 based on the identity of event 130 or other contextual information. For example, if coprocessor 140 knows what activity should occur when a given event arrives, then event descriptor 150 need not specify a logic. In that case coprocessor 140 may execute logic that has been preconfigured to perform upon arrival of the event.

Event descriptor 150 may be software configurable. For example, the relationship between event 130 and logic 160 may be configurable.

For example, event descriptor 150 may specify, as a precondition, that coprocessor 140 should not perform logic 160 until coprocessor 140 receives event 130. Likewise, event descriptor 150 may specify, as a post-condition, that coprocessor 140 should perform logic 160 and then wait until coprocessor 140 receives event 130 before performing subsequent work, such as processing another descriptor. Likewise, event descriptor 150 may specify that coprocessor 140 should send a particular event after executing logic 160.

Furthermore, there may be a tightly-coupled hardware integration between event-wait circuitry and event-delivery circuitry. The operation of the event circuitry may be exposed to descriptor framework software such that any type of descriptor (data movement, program, or other) may send or wait for an event.

In an embodiment, event-delivery circuitry has a wire that is exclusively dedicated for delivering events having a same identifier. The wire is on or off based on whether the event is set or clear.

In an embodiment, delivery of events with different identifiers share enough wires to transmit a binary encoding of any integer identifier of any event. For example, support for five integer identifiers requires three wires. An additional wire may indicate event polarity, i.e. set or clear.

2.1 Example Coordination

In an embodiment, any event may be specified to be set or cleared when a coprocessor finishes executing the logic of an event descriptor. Likewise, any event can be specified by a descriptor to be at a specified value (on or off, set or clear) before the coprocessor executes the logic that is identified by the descriptor.

Such an embodiment enables the events to be used as a flow control gate by the logic that executes the descriptor. Combining the capability of one descriptor to specify setting or clearing an event along with another descriptor requiring that same event to be at a specified state provides a mechanism to control the order of descriptor logic execution among multiple coprocessors or multiple execution units of a single coprocessor.

A data movement descriptor is an event descriptor that specifies a block transfer of data, such as between memory and a coprocessor. For example, a system on a chip (SoC) may have multiple computational cores that act as coprocessors. A DMA channel that is associated with a first core moves data from off-chip memory to on-chip memory according to the logic of a first data movement descriptor.

A second DMA channel associated with a second core will take the data, once it arrives on chip, and perform a hash on the data according to the logic of a second event descriptor. The second descriptor needs to be flow controlled to delay the start of its logic until the logic of the first descriptor has finished moving the data.

This coordination is done by using an event as a flow-control signal that is specified by the second descriptor. The event is initialized to be off/clear by software running on the second core.

The first descriptor is configured to send the event when the logic of the first descriptor finishes. The second descriptor is configured to make the second core wait until the second core receives the event. Thus, the logic of the second descriptor does not begin execution until the logic of the first descriptor has moved data on chip and sent the event.

2.2 Cascaded Operation

Distributed events may enable behavioral serialization without central control. This may be used to achieve a processing pipeline or daisy chain.

Once descriptors have been configured on various channels on different cores, this technique can be used as a hardware mechanism to transfer a semaphore between cores, which provides a strict ordering of descriptor logic executions. For example, DMA channels associated with three cores move one buffer each to an external memory.

A first core will move its data first, followed by a second core, which is followed by a third core. Initial descriptors on all three cores can be configured to wait for an event to arrive. Software running on each core puts descriptors on the core's respective DMA channel to configure, but not yet cause, DMA activity.

Software on the first core then begins the activity by sending an event to itself. For example, the first core sends the event to its own data movement channel. This enables the channel on the first core to execute.

When that execution finishes, an event is sent to the second core or to its data channel, as specified by the descriptor of the first core. This causes the second core or its data channel to proceed in a similar manner.

When the second core or its data channel finishes, it sends an event to the third core, as specified by the descriptor of the second core. This causes the third core to proceed in a similar manner. This cascaded behavior occurs without central orchestration.

3.0 Example Flow Control Process

Figure 2:
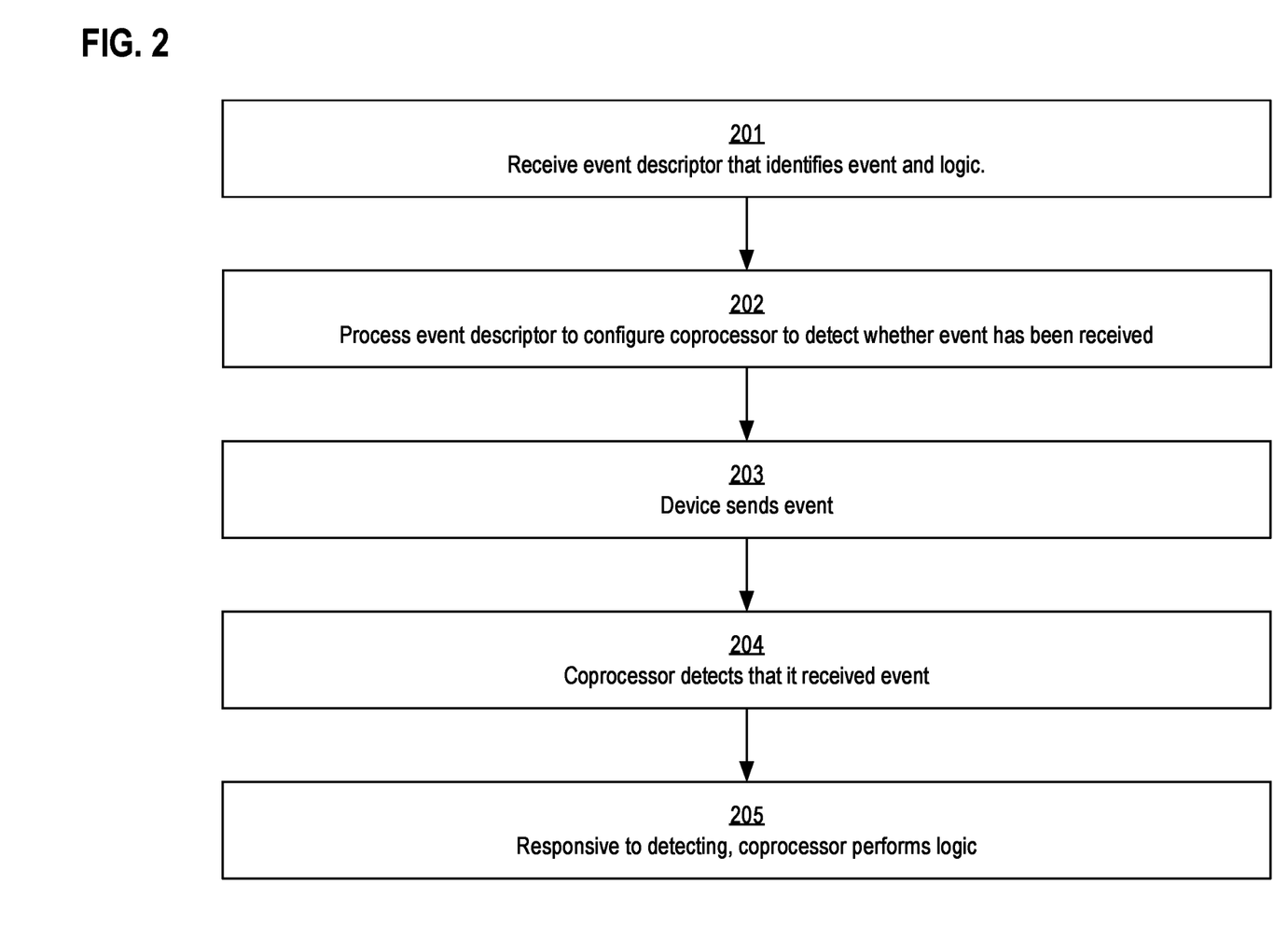
FIG. 2 is a flow diagram that depicts an example process for enforcing flow control, in an embodiment.

FIG. 2 is a flow diagram that depicts an example process that uses an asynchronous event to perform flow control for a coprocessor, in an embodiment. This flow control process is described in the context of FIG. 1.

Steps 201-202 prepare a coprocessor for an event. The event is sent during step 203. Steps 204-205 accept the event.

Step 203 occurs before steps 204-205. However, the ordering of step 203 relative to steps 201-202 depends on a particular scenario.

For example, because an event is asynchronous, the event may be sent before the coprocessor is configured for the event. As such, step 203 may occur before step 201, during either of steps 201-202, or after step 202.

In step 201, a coprocessor receives an event descriptor that identifies an event and a logic. For example, coprocessor 140 receives event descriptor 150 that identifies event 130 and logic 160. In an embodiment, event descriptor 150 is provided to coprocessor 140 by storing event descriptor 150 within memory that is shared by coprocessor 140 and at least one other device of computer 100.

The provider of event descriptor 150 may or may not be device 120, which sent or will send event 130. For example in an embodiment with three coprocessors, coprocessor 140 may receive event descriptor 150 from a first coprocessor and receive event 130 from a second coprocessor. That is, the source of event descriptor 150 and the source of event 130 may be different.

In an embodiment with as few as one coprocessor, CPU 110 may send either or both of event descriptor 150 and event 130. Likewise, coprocessor 140 may receive from itself either or both of event descriptor 150 and event 130.

In one embodiment, an event descriptor may be sent by either CPU 110 or a coprocessor. In another embodiment, only CPU 110 may send an event descriptor.

In an embodiment, event descriptor 150 is software configurable. For example, attributes of event descriptor 150 such as an identifier of event 130 or of logic 160 may be assigned in a just-in-time manner immediately before event descriptor 150 is provided to coprocessor 140.

In an embodiment, the recipient of event descriptor 150 (such as coprocessor 140) is not decided until immediately before event descriptor 150 is provided to its recipient. For example, which coprocessor is least busy may be dynamically selected as the recipient.

In an embodiment, coprocessor 140 generates for itself an event descriptor 150. For example, CPU 110 may send events that cause coprocessor 140 to transition to other operational states. Likewise, coprocessor 140 may autonomously cause itself to transition into another state by sending itself an event.

In step 202, the coprocessor processes the event descriptor to configure the coprocessor to detect whether the event has been received. For example, coprocessor 140 processes event descriptor 150 to configure coprocessor 140 to detect whether event 130 has been received.

During this processing, coprocessor 140 may extract the identifiers of event 130 and logic 160 from within event descriptor 150. Coprocessor 140 may register event 130 as an expected event and register logic 160 as a handler for that event.

In step 203 a device within the computer sends the event to the coprocessor. For example, device 120 sends event 130 to coprocessor 140.

In an embodiment, coprocessor 140 may be a composite that aggregates additional devices that may send or receive events. For example, coprocessor 140 may contain device 120.

For example, coprocessor 140 may contain or otherwise be associated with a DMA channel that autonomously sends an event when a requested memory block arrives onto the chip of coprocessor 140. Coprocessor 140 may have multiple such DMA channels.

Event delivery may be directly implemented in hardware. In an embodiment, computer 100 has circuitry that is reserved for event delivery.

In an embodiment, coprocessor 140 executes an instruction that is reserved for detecting receipt of an event, such as 130. In an embodiment, device 120 executes an instruction that is reserved for sending an event, such as 130.

In an embodiment, delivery of a particular event is idempotent. For example, if two coprocessors send a third coprocessor a same event (having a same event identifier), the third coprocessor may or may not be able to detect various aspects such as that the same event was delivered more than once, which coprocessor sent the event first, or which coprocessors sent the event at all.

In step 204, the coprocessor detects that it received the event. For example, coprocessor 140 detects that it received event 130.

In an embodiment, coprocessor 140 executes an instruction that waits until event 130 is received. This instruction may cause coprocessor 140 to enter a power-saving mode until event 130 is received, or until other particular events are received if coprocessor 140 is also waiting on other events, or until any event is received. In an embodiment, coprocessor 140 may or may not be able to detect various aspects such as which device sent event 130 or when event 130 was sent.

In an embodiment, coprocessor 140 may processes several event descriptors in parallel, perhaps by multithreading. In such an embodiment, coprocessor 140 may avoid entering the power-saving mode until all threads are blocked and waiting on various events.

Responsive to performing step 204, in step 205 the coprocessor performs the logic identified by the event descriptor. For example, coprocessor 140 executes logic 160 in response to detecting that coprocessor 140 received event 130.

In an embodiment, logic 160 may or may not be able to detect various aspects of event 130. For example, logic 160 may or may not be able to detect which event is received, even though such a detail may be available during step 204.

For example, coprocessor 140 may be configured to execute logic 160 when either of two different events occur, such as event 130 and event X. Invocation of logic 160 may occur without providing logic 160 the identifier of the current event. As such, logic 160 should be configured to operate correctly without knowing whether it is being invoked for event 130 or event X.

Logic 160 may specify additional flow control behaviors. For example, logic 160 may send other events and generate and/or process other descriptors. In this way, coprocessor 140 may dynamically coordinate workflow of its own, of other coprocessors, or of the CPU.

However, multiple descriptors may be provided to the same or different coprocessors prior to sending events. For example, orchestration of multiple coprocessors may be configured before or during event processing.

Such configurability enables important patterns of distributed behavior, especially scheduling paradigms such as pipelining, scatter/gather, and work stealing. These patterns can increase throughput, improve load balancing, and hide latency.

In an embodiment, event descriptor 150 may be canceled after being sent by device 120, but before coprocessor 140 executes event descriptor 150. In an embodiment, such cancelling may be used to achieve work stealing. For example, an idle coprocessor that is not coprocessor 140 may cancel event descriptor 150 for coprocessor 140 and take event descriptor 150 for itself.

4.0 Descriptor Queue

Figure 3:
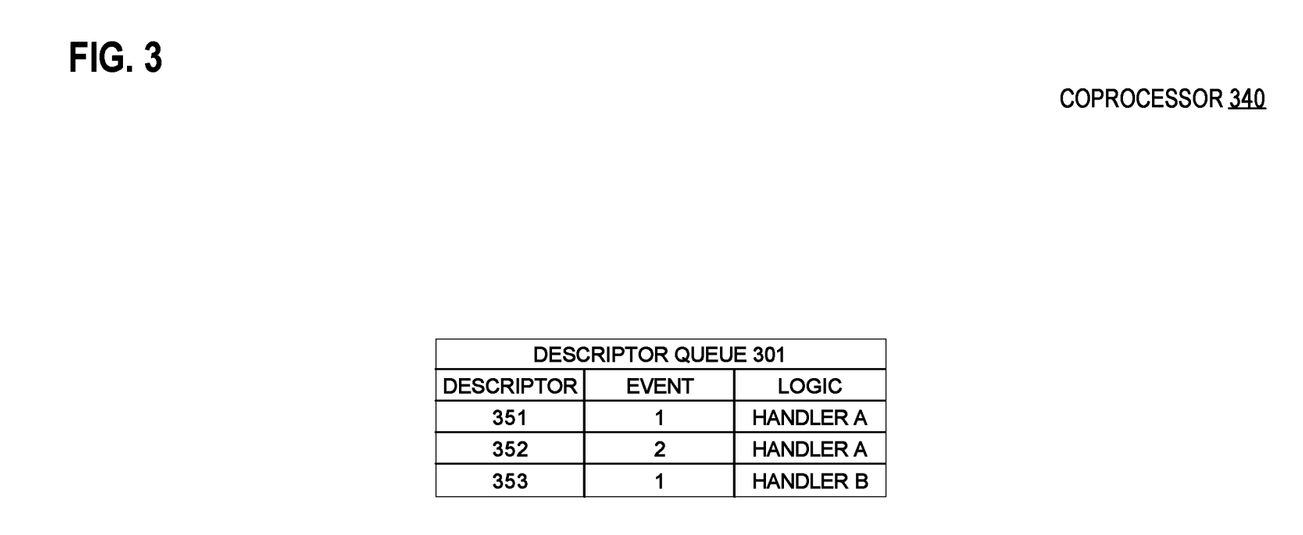
FIG. 3 is a block diagram that depicts an example coprocessor that maintains a workflow queue, in an embodiment.

FIG. 3 is a block diagram that depicts an example coprocessor 340, in an embodiment. Coprocessor 340 has descriptor queue 301 that sequences workflow. Coprocessor 340 may be an implementation of coprocessor 140.

Descriptor queue 301 may be a hardware first-in first-out (FIFO) or a data structure within a random access memory (RAM). For example, descriptor queue 301 may be an array, a linked list, a priority queue, or other aggregation structure that may or may not impose an ordering upon the descriptors that it stores.

Descriptor queue 301 may store descriptors, each of which may describe a unit of work to be performed by coprocessor 340. In an embodiment, descriptor queue 301 may have a limited capacity. For example, descriptor queue 301 may be a circular queue. In an embodiment, the capacity is software configurable.

Each row of descriptor queue 301 has a distinct descriptor. In this example, descriptor queue 301 contains descriptors 351-353.

In an embodiment, coprocessor 340 removes and processes whichever descriptor has been stored within descriptor queue 301 for the longest duration. For example, coprocessor 340 may remove descriptor 351 from the head of descriptor queue 301 and then process descriptor 351.

In an embodiment, coprocessor 340 processes descriptors entirely serially. For example, coprocessor 340 may remove descriptor 351 from descriptor queue 301, wait for an event that is specified by descriptor 351, and then execute a logic that is specified by descriptor 351. Only after such complete processing of descriptor 351 may coprocessor 340 begin processing of the next descriptor in descriptor queue 301, which is descriptor 352.

In an embodiment, coprocessor 340 may scan descriptor queue 301 for a descriptor whose event is presently received. For example, descriptor queue 301 has descriptors that specify events 1-2. If event 2 is the only event presently received, then coprocessor 340 may process descriptor 352 before processing descriptor 351.

In another embodiment, coprocessor 340 only executes an event descriptor if the event descriptor has reached the front of descriptor queue 301. For example if coprocessor 340 receives event 2 without yet receiving event 1, then coprocessor 340 will not yet execute event descriptor 352, even though the event needed for execution of event descriptor 352 has already been received. For example, event descriptor 352 will not be executed until event 1 is received, event descriptor 351 has finished executing, and event descriptor 351 has been removed from descriptor queue 301.

In an embodiment, coprocessor 340 decouples the reading of a descriptor (e.g., step 202 in FIG. 2) from the execution of the logic that is identified by the descriptor (e.g., step 205). As such, step 202 may operate akin to instruction prefetch such that decoding (analyzing) a descriptor may occur more or less arbitrarily before execution of the descriptor.

In this manner, coprocessor 340 may interleave its processing of different descriptors. This may be used to achieve pipelining. For example, coprocessor 340 may configure itself to receive event 1 specified by descriptor 351, and then initiate processing of descriptor 352, even though event 1 for descriptor 351 is not yet received and so handler A for descriptor 351 is not yet executed.

In this manner, coprocessor 340 may be able to execute some logic, regardless of which event arrives next. For example, handler A may be invoked as soon as either of events 1-2 arrive.

In an embodiment, a descriptor may be appended to the end of descriptor queue 301. Depending on the embodiment, various components may append a descriptor onto descriptor queue 301.

For example any of coprocessor 340, another coprocessor or device, or a CPU may append a descriptor onto descriptor queue 301. In an embodiment, the other coprocessor or CPU waits until descriptor queue 301 has a spare capacity before appending the next descriptor.

In an embodiment, coprocessor 340 limits interleaving of processing of descriptors. For example, descriptors 351 and 353 expect the same kind of event, which is event 1. However, descriptors 351 and 353 should be invoked upon separate arrivals (raisings) of event 1.

Whereas, descriptors 351 and 353 both expect event 1. As such, coprocessor 340 may delay processing descriptor 353 until descriptor 351 has executed and event 1 arrives a second time.

That is, when event 1 first occurs, only descriptor 351 should be executed. Only after event 1 is cleared and the set a second time should descriptor 353 be executed. Whereas in an embodiment, descriptors 351-352 expect different events and so may be interleaved.

4.1 Fire and Forget

A system on a chip (SoC) may have multiple computational cores and DMA channels that act as coprocessors. Asynchronous events can be used to create a synchronization barrier based on event descriptors that enforce an ordering of executions between descriptor logics running on DMA channels that are associated with a same processor core.

Such a barrier descriptor may force all preceding descriptors from that channel to be completed before the barrier descriptor is processed, so long as the preceding descriptors are managed within a descriptor queue. This allows software to create descriptor chains and enforce ordering between them where descriptors read from different (possibly high latency) data sources that have no guaranteed ordering between them when parallelized.

Using a barrier descriptor with a descriptor queue allows software to take a fire-and-forget approach with descriptors, such that the software configures the entire descriptor chain by iteratively specifying appropriate event waits on descriptors and putting those descriptors on a descriptor queue of a coprocessor so that the coprocessor can start executing them when the gating conditions are satisfied. This also reduces the overall latency of descriptor creation, distribution, and queuing because hardware can automatically advance to execute the next descriptor when a condition that is gating it is removed. This may outperform a more traditional software approach where a routine running on the core gets a notification about completion of one unit of work and not until then does the software provide the next unit of work to be executed.

5.0 Preregistration

Figure 4:
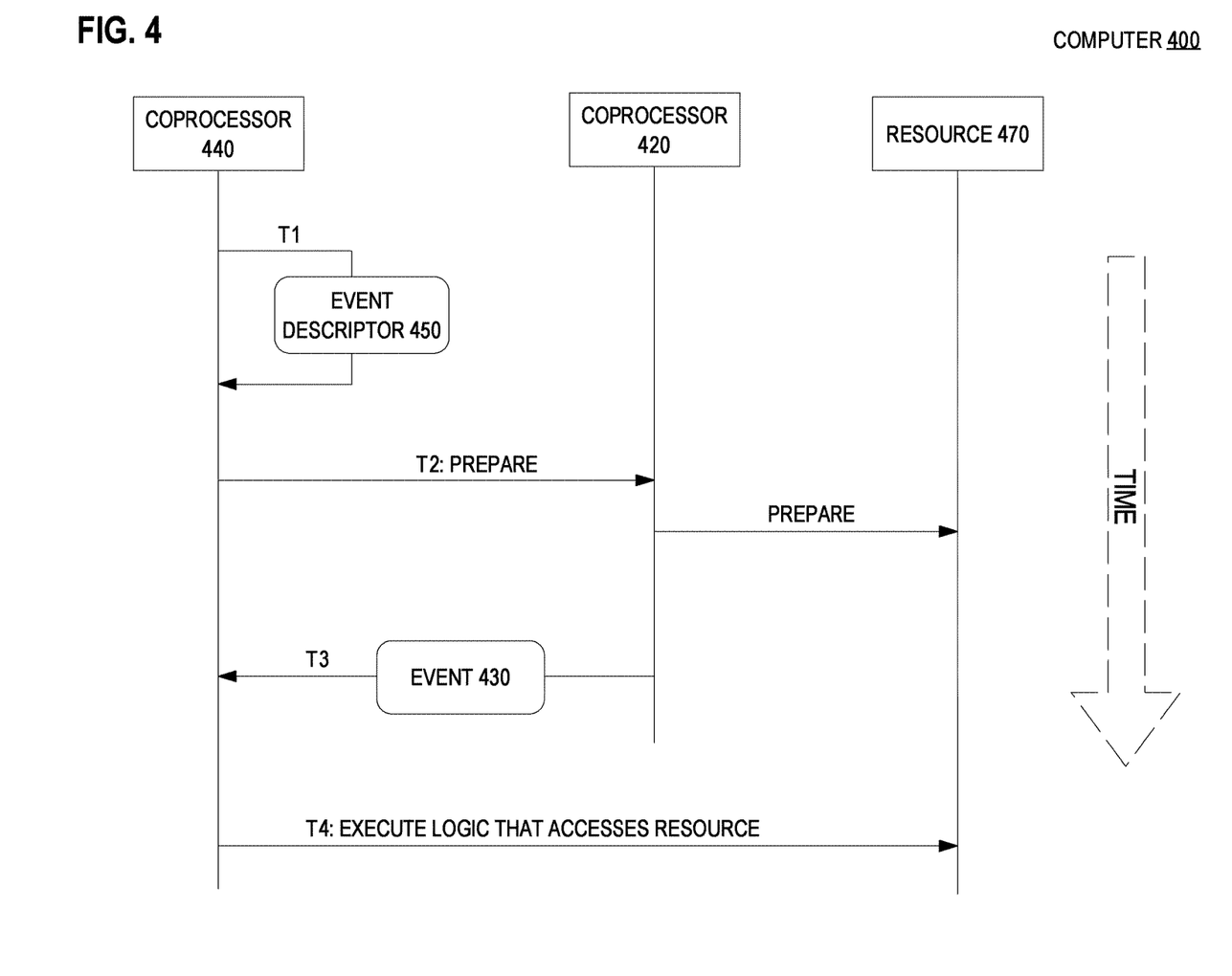
FIG. 4 is a scenario diagram that depicts preparation for resource utilization, in an embodiment.

FIG. 4 is a scenario diagram that depicts an example computer 400, in an embodiment. Computer 400 preregisters a unit of work before the work can begin.

Computer 400 contains coprocessors 420 and 440 and resource 470. Computer 400 may be an implementation of computer 100.

FIG. 4 depicts the passage of time proceeding downwards according to a timeline that is shown as a dashed vertical arrow. Along this timeline, discrete times T1-T4 occur in sequence.

Coprocessor 440 expects to use resource 470. Resource 470 may be a hardware resource or a software resource, such as configuration or other data.

Resource 470 is initially non-existent, momentarily unavailable, not yet configured, or otherwise unready. For example, resource 470 may be a data buffer that initially lacks content.

Although resource 470 is initially unready, coprocessor 440 may immediately configure event descriptor 450 to specify logic that uses resource 470. Coprocessor 440 may immediately submit event descriptor 450 to any receiver, such as itself as shown or another coprocessor, so long as event descriptor 450 specifies an event as a precondition that will not actually occur until resource 470 is ready.

At time T1, preregistration occurs. Coprocessor 440 generates event descriptor 450. In other examples, at time T1, coprocessor 440 receives event descriptor 450 from a CPU or another coprocessor such as 420. Event descriptor 450 designates event 430 as a precondition to executing whatever logic is identified by event descriptor 450.

At time T2, various activities may occur in parallel, thereby increasing throughput. Coprocessor 440 configures itself to receive event 430, according to event descriptor 450. Coprocessor 440 requests that coprocessor 420 prepare resource 420 in the background and on behalf of coprocessor 440. Coprocessor 420 prepares resource 470 for subsequent use.

At time T3, a device announces that resource 470 is ready by sending event 430 to coprocessor 440. Although event 430 is shown as sent by coprocessor 420, in other examples, other devices may send event 430. For example, resource 470 may announce its own readiness by sending event 430.

Having received event 430, at time T4 coprocessor 440 executes whatever logic is associated with event descriptor 450. That logic may access resource 470 because at time T4, resource 470 has already been prepared and is ready to use.

As a more specific example, resource 470 may be a DMA channel. Coprocessors 420 and 440 may reside within a system on a chip (SoC), with main memory on another chip. After managing the DMA channel to fulfil a memory fetch on behalf of coprocessor 440, coprocessor 420 may send event 430 to notify coprocessor 440 that a requested memory block has arrived on chip from main memory. As such, event 430 signals data availability.

6.0 Global Event Distributor

Figure 5:
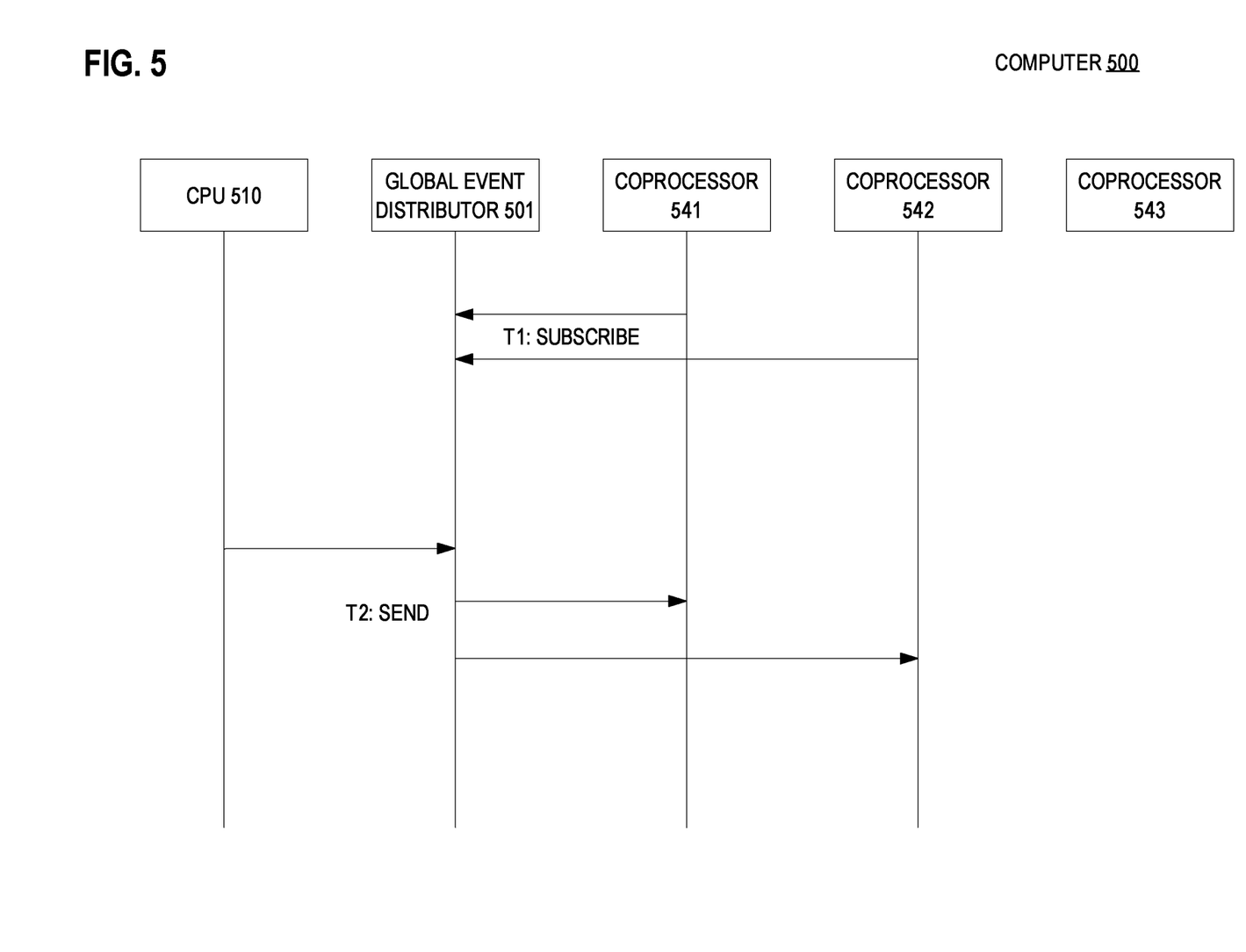
FIG. 5 is a scenario diagram that depicts event subscription and publication, in an embodiment.

FIG. 5 is a scenario diagram that depicts an example computer 500, in an embodiment. Computer 500 decouples responsibility for generating an event from responsibility for designating a recipient of the event.

Computer 500 contains coprocessors 541-543, CPU 510, and global event distributor 501. Computer 500 may be an implementation of computer 100.

Multiple coprocessors may await a same event. For example, multiple coprocessors may wait for a same resource to be initialized. In another example, multiple coprocessors may wait at a synchronization barrier.

Global event distributor 501 acts as an intermediary that relays an event from a sender to any amount of interested recipients. At time T1 interested coprocessors 541-542 notify global event distributor 501 of their interest in a particular event by sending a subscription request. The subscription request identifies the particular event of interest and identifies which coprocessor is interested.

Embodiments may differ at implementing a subscription request, if at all. In a preferred embodiment, software of CPU 510 may configure global event distributor 501 to broadcast or multicast some events and not others, based on event identifiers. In such an embodiment, coprocessors do not send subscription requests.

In an embodiment, an event identifier may be registered as a global event with global event distributor 501. When such an event is actually raised, global event distributor 501 may automatically relay the event to all coprocessors or all coprocessors that have an event descriptor that expects that event.

In an embodiment, an event descriptor may indicate (such as with a flag) whether an expected event is local (point-to-point) or global (multicast). As such, the descriptor queue circuitry of a coprocessor may signal global event distributor 501 whenever an event descriptor is queued that specifies a global event. In an embodiment, a coprocessor may use a flag (e.g. a wire) to indicate whether an event that the coprocessor is currently sending is local or global.

Although coprocessors 541-542 are shown as subscribing together at time T1, their subscription requests need not actually be simultaneous.

A coprocessor need not subscribe to a particular event or any events at all. For example, coprocessor 543 is not subscribed.

Multiple coprocessors may subscribe to a same event. Distinct coprocessors may subscribe to distinct events.

A coprocessor may subscribe to multiple events. A coprocessor may cancel any or all of its subscriptions. However in a preferred embodiment that implements global events without subscriptions, software of CPU 510 dynamically reconfigures global event distributor 501 to implement which events does global event distributor 501 intercept and multicast.

For example, the circuitry of global event distributor 501 may be connected to the event delivery circuitry that interconnects the coprocessors. If global event distributor 501 detects an attempt to deliver an event that is registered as global, then global event distributor 501 may multicast the same event to other coprocessors.

In some examples at time T2, a resource has become ready or a barrier is withdrawn. At time T2, CPU 510 detects and announces this condition by sending an event to global event distributor 501.

CPU 510 need not be aware of which coprocessors are interested in the event. For example, no coprocessors may be subscribed to that event, in which case global event distributor 501 discards the event.

However in this example, coprocessors 541-542 are subscribed to that event. As such, global event distributor 501 sends a copy of that event to both of coprocessors 541-542, but not 543.

In that manner, global event distributor 501 implements a publish/subscribe communication mechanism. Each event identifier represents a separate publish/subscribe topic.

In an embodiment, global event distributor 501 implicitly clears out (unsubscribes) all subscriptions to a given event after sending that event. In another embodiment, a subscription lingers after sending the event until expressly canceled (unsubscribed) by a given interested coprocessor or by reconfiguration of global event distributor 501, such as by CPU 510 or coprocessor 541. In that case, when the same event identifier is reused when sending events to global event distributor 501, then an interested coprocessor may repeatedly receive events with that identifier.

In an embodiment, an interested coprocessor may detect that an event is received but may or may not be able to detect how many times the event has been received. In an embodiment, an interested coprocessor clears an event soon after receiving it, perhaps so that repeated delivery of the event can be detected.

In an embodiment, an interested coprocessor may or may not be able to detect whether an event came directly from another coprocessor or was relayed by global event distributor 501. In an embodiment, an interested coprocessor may or may not be able to detect which other coprocessor sent the event through global event distributor 501.

7.0 Event Bitmap

Figure 6:
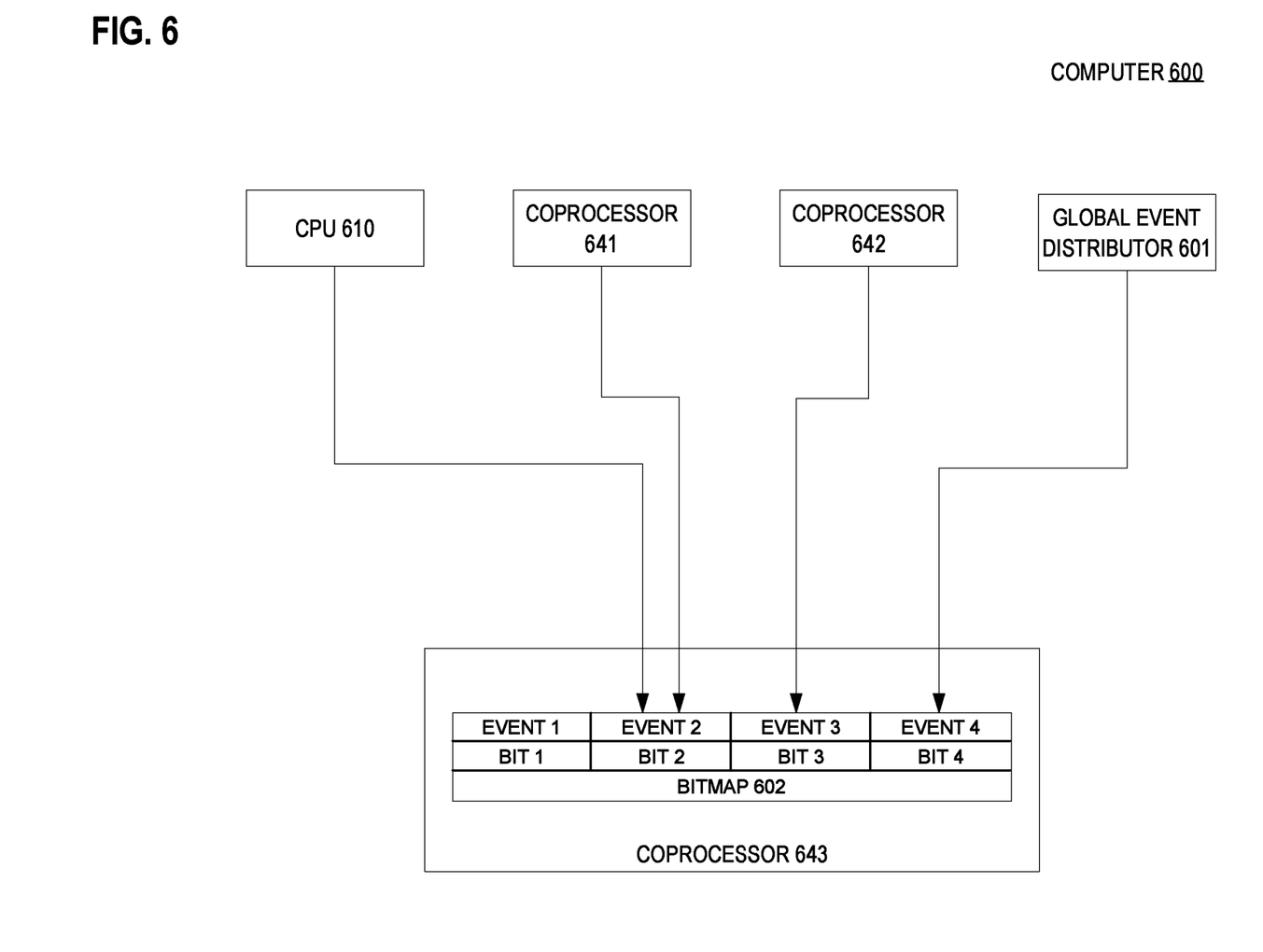
FIG. 6 is a block diagram that depicts an example computer with an event bitmap in a coprocessor, in an embodiment.

FIG. 6 is a block diagram that depicts an example computer 600, in an embodiment. Each coprocessor of computer 600 has an event bitmap to indicate which events are received.

Computer 600 may be an implementation of computer 100. Computer 600 contains CPU 610, coprocessors 641-643, and global event distributor 601.

Coprocessor 643 has bitmap 602 that indicates which events are received. Although not shown, coprocessors 641-643 may each have their own event bitmaps.

Bitmap 643 has bits 1-4. Each of bits 1-4 corresponds to a respective event of events 1-4.

When a bit is set, it indicates that a corresponding event is received. When the bit is clear, it indicates that the corresponding event is not received.

Bits 1-4 may initially be clear. In an embodiment, the mechanism for delivering the clearing of an event is the same mechanism as for the raising of an event.

For example, event delivery circuitry may have a bit or wire whose polarity indicates whether a given event is raised or cleared. In an embodiment, any component that can raise or deliver an event can also clear that event.

In an embodiment, any component that can clear an event can clear any event, regardless of which component raised the event and which components received the event. For example, coprocessor 641 may raise an event that global event distributor 601 multicasts to both of coprocessors 641-642. Whereas, CPU 610 may globally clear the event, despite neither sending nor receiving the event.

The circuitry of computer 600 is such that sending any of events 1-4 to coprocessor 643 causes the corresponding bit of bitmap 602 to be set. For example, CPU 610 may send event 2 to coprocessor 643, which sets bit 2.

A coprocessor may wait for a given bit to be set, perhaps by executing an instruction that blocks until the bit gets set when the corresponding event arrives. In an embodiment, the bit is implicitly cleared when the instruction unblocks.

In an embodiment, a coprocessor may wait until an event bit is cleared. As such, the cancellation of an event may be as significant as the original assertion of the event.

In an embodiment, the bit is implicitly cleared when the logic specified by a corresponding event descriptor finishes executing. In embodiment, the bit may linger as set until expressly cleared, despite repeated deliveries of the event.

In such an embodiment, repeated occurrences of the event are idempotent so long as there is no intervening clearing of the corresponding bit. For example, CPU 610 and coprocessor 641 may both send (perhaps simultaneously) event 2 to coprocessor 643.

At some later time while bit 2 is still set, coprocessor 643 may notice that bit 2 is set and execute logic for event 2. Coprocessor 643 may execute that logic perhaps only once, even though event 2 was sent twice.

In another example, based on a first event descriptor, coprocessor 643 may wait for event 2. When event 2 arrives, bit 2 gets set, and coprocessor 743 executes a first logic and then clears bit 2.

Later based on a second event descriptor, coprocessor 643 may again wait for event 2. However, the second event descriptor specifies a different logic, which executes when event 2 arrives again and coprocessor 643 notices that bit 2 is again set.

In this manner, coprocessor 643 may repurpose an event by reusing its event identifier in other contexts. Furthermore, reuse of event identifiers may reduce the total amount of distinct event identifiers needed by a system. Fewer distinct identifiers can be represented with less circuitry, which may reduce capital and operational costs and perhaps increase performance.

7.1 Event Multiplexing

In an embodiment, a descriptor may specify multiple events as a precondition to executing logic that the descriptor specifies. In an embodiment, all of the specified events must arrive before the specified logic executes.

For example, a descriptor may specify events 3-4 as a conjunctive precondition, in which case event logic does not execute until both of bits 3-4 are set. Waiting on all of multiple events may be accomplished by executing an instruction that waits for multiple particular bits of bitmap 602 to be set.

Events 3-4 need not be sent by a same device. For example, coprocessor 642 sends event 3, and global event distributor 601 sends event 4.

In an embodiment, specified logic executes if any of multiple specified events arrive. For example, an instruction may wait until any bit of bitmap 602 is set that corresponds to any of multiple events specified by a descriptor.

For example, a descriptor may specify events 3-4 as a disjunctive precondition, in which case event logic does not execute until at least one of bits 3-4 is set. Waiting on any of multiple events may be accomplished by executing an instruction that waits for any of multiple particular bits of bitmap 602 to be set.

In an embodiment, a coprocessor may wait for any of multiple particular events and detect which of those particular events is actually received. In such an embodiment, the coprocessor may decide which logic to execute based on which event is received.

In an embodiment, a coprocessor may detect, without blocking, which bits of its event bitmap are set or whether a particular bit is set. For example, the coprocessor may execute a non-blocking peek instruction to accomplish polling.

For example, instead of a descriptor waiting for an event, a coprocessor may poll the event bitmap, and then enqueue the descriptor when the bitmap is in the desired state. In an embodiment, coprocessors block instead of polling, but CPU 610 polls instead of blocking.

In an embodiment, global event distributor 601 may have an event bitmap that is similar to bitmap 602. An originating device may cause an event to be published by setting the corresponding bit within the event bitmap of global event distributor 601. Global event distributor 601 detects the set bit and sends the corresponding event to subscribers.

In an embodiment, the event bitmap of global event distributor 601 has two bits per event. One bit may indicate whether an event is raised or not. A second bit may indicate whether the event is global or local. Global event distributor 601 only multicasts the event if the second bit indicates that the event is global.

A device may also cause an event to be globally canceled by clearing the corresponding bit within the event bitmap of global event distributor 601. Global event distributor 601 detects the cleared bit and clears the same bit in the event bitmap of each subscriber of that event.

In an embodiment, an event descriptor may specify an event bit to set or clear after a coprocessor finishes a logic specified by the descriptor. For example a descriptor may specify waiting for an event, executing a logic after waiting, and clearing the corresponding event bit after executing the logic.

In an embodiment, at any time during execution of a descriptor, its logic may send an event. In an embodiment, the event is delivered as soon as the logic sends it, to increase distributed throughput. In an embodiment, a coprocessor executes a logic and accumulates (delays) events that the logic sends until the logic finishes and then sends the events. For example, the coprocessor may delay event deliver to prevent a race condition.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
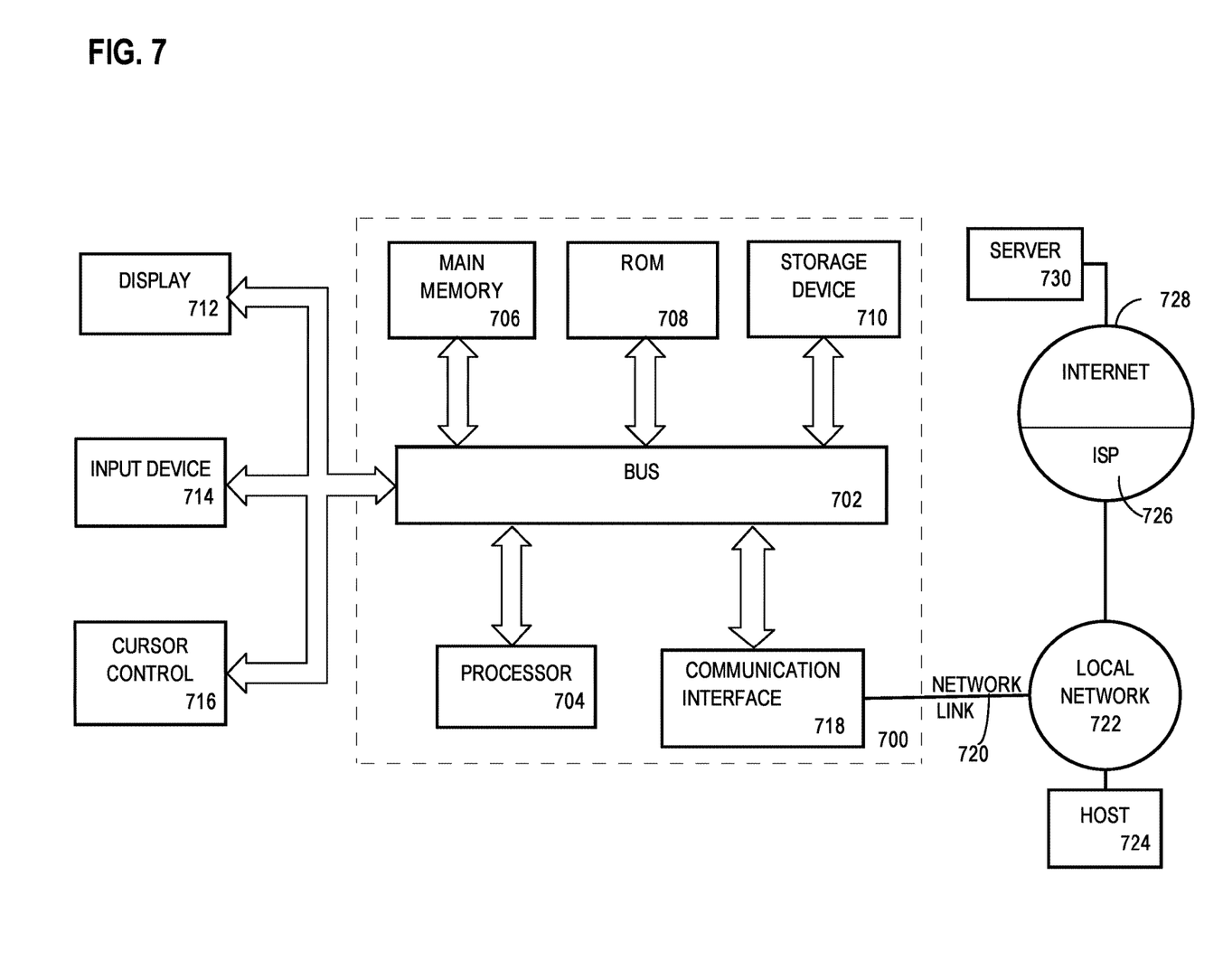
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In an embodiment, computer system 700 generates code or receives code over a network or from storage device 710. Computer 700 may store generated or received code in volatile or non-volatile storage.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an event descriptor that identifies a particular event and a logic;
   executing an instruction that specifies a plurality of events, including the particular event, to receive;
   sending, on one or more wires that are exclusively dedicated for delivering events, said particular event by a device of a CPU to a global event distributor, wherein said global event distributor, a coprocessor, and said CPU reside on a same chip;
   selecting, by said global event distributor based on said particular event, a subset plurality of coprocessors from a first plurality of coprocessors of said CPU, wherein said subset plurality of coprocessors contains at least said coprocessor and another coprocessor;
   relaying said particular event from said global event distributor to said subset plurality of coprocessors;
   waiting until any event of said plurality of events is received;
   responsive to detecting said particular event is received, said coprocessor performing said logic.

2. The method of claim 1 wherein said device of said CPU comprises a second coprocessor of said CPU.

3. The method of claim 1 wherein said device of said CPU comprises said coprocessor.

4. The method of claim 1 wherein said receiving said event descriptor comprises receiving said event descriptor onto a descriptor queue.

5. The method of claim 1 wherein:
   said logic specifies using a particular resource;
   the method further comprises said device of said CPU preparing said particular resource after said receiving said event descriptor.

6. The method of claim 1 wherein said device of said CPU comprises at least one of: a direct memory access (DMA) controller or a DMA channel.

7. The method of claim 1 further comprising said coprocessor sending, to said global event distributor, a request to subscribe to said particular event.

8. The method of claim 7 further comprising, in response to said relaying said particular event to said subset plurality of coprocessors, said global event distributor automatically canceling said request to subscribe to said particular event.

9. The method of claim 1 wherein:
   said sending said particular event consists of sending said particular event through circuitry;
   said waiting until any event of said plurality of events is received comprises said coprocessor waits until all events of the plurality of events are received.

10. The method of claim 1 wherein said event descriptor identifies a second event for said coprocessor to send after performing said logic.

11. The method of claim 1 wherein said event descriptor identifies a second event for said coprocessor to receive before performing a logic of another event descriptor.

12. The method of claim 1 further comprising:
    receiving a second event descriptor that identifies a second event and a second logic,
    wherein the plurality of events comprises the second event;
    processing said second event descriptor to configure said coprocessor to detect whether said second event has been received;
    wherein said detecting that said particular event is received comprises detecting that said particular event or said second event is received;
    wherein said coprocessor performing said logic comprises said coprocessor performing said logic or said second logic based on whether said particular event or said second event was received.

13. The method of claim 1 wherein said sending said particular event comprises said device of said CPU setting or clearing a particular bit of an event register within said coprocessor.

14. The method of claim 13 further comprising:
after said performing said logic, receiving a second event descriptor that identifies said particular event and a second logic;
clearing said particular bit of said event register;
detecting, by said coprocessor, that said particular bit is set after said clearing said particular bit;
responsive to said detecting that said particular bit is set after said clearing, said coprocessor performing said second logic.

15. The method of claim 1 wherein performing said logic comprises said coprocessor sending a second event, wherein said second event is delivered after performing said logic finishes.

16. The method of claim 1 wherein performing said logic comprises said coprocessor sending a second event, wherein said second event is delivered before performing said logic finishes.

17. A system comprising:
a central processing unit (CPU);
a first plurality of coprocessors that are connected to the CPU, including a coprocessor configured to:
receive an event descriptor that identifies a particular event and a logic,
execute an instruction that specifies a plurality of events, including the particular event, to receive by said coprocessor,
wait until any event of said plurality of events is received, and
responsive to detecting said particular event is received, perform said logic;
a global event distributor connected to said first plurality of coprocessors and configured to:
select, based on said particular event, a subset plurality of coprocessors from said first plurality of coprocessors, wherein said subset plurality of coprocessors contains at least said coprocessor and another coprocessor; and
relay said particular event to said subset plurality of coprocessors, wherein said global event distributor, said coprocessor, and said CPU reside on a same chip;
a device connected to the global event distributor and configured to send, on one or more wires that are exclusively dedicated for delivering events, said particular event to said global event distributor.

* * * * *